United States Patent
Hansen et al.

(10) Patent No.: US 7,266,427 B2
(45) Date of Patent: Sep. 4, 2007

(54) INTELLIGENT VALVE FLOW LINEARIZATION

(75) Inventors: Peter Daniel Hansen, Wellesley, MA (US); Bulent Goksel, Quincy, MA (US)

(73) Assignee: Invensys Systems, Inc., Foxboro, MA (US)

( * ) Notice: Subject to any disclaimer, the term of this patent is extended or adjusted under 35 U.S.C. 154(b) by 73 days.

(21) Appl. No.: 11/203,615

(22) Filed: Aug. 15, 2005

(65) Prior Publication Data

US 2005/0273204 A1 Dec. 8, 2005

Related U.S. Application Data

(62) Division of application No. 09/503,508, filed on Feb. 14, 2000, now Pat. No. 7,096,093.

(51) Int. Cl.
*G05D 11/00* (2006.01)
(52) U.S. Cl. .................. 700/282; 700/302; 702/47
(58) Field of Classification Search ............... 700/282, 700/302; 702/47, 182
See application file for complete search history.

(56) References Cited

U.S. PATENT DOCUMENTS

| 4,029,122 | A | | 6/1977 | Jaegtnes |
| 4,274,438 | A | | 6/1981 | LaCoste |
| 4,277,832 | A | * | 7/1981 | Wong ..................... 700/282 |
| 4,581,707 | A | | 4/1986 | Millar |
| 5,043,863 | A | | 8/1991 | Bristol et al. |
| 5,143,116 | A | | 9/1992 | Skolund |
| 5,251,148 | A | * | 10/1993 | Haines et al. ............... 700/282 |
| 5,329,465 | A | | 7/1994 | Arcella et al. |
| 5,374,884 | A | | 12/1994 | Koren et al. |
| 5,394,322 | A | | 2/1995 | Hansen |
| 5,406,474 | A | | 4/1995 | Hansen |
| 5,424,941 | A | | 6/1995 | Bolt et al. |
| 5,455,781 | A | | 10/1995 | Reynal et al. |
| 5,538,036 | A | | 7/1996 | Bergamini et al. |
| 5,541,833 | A | | 7/1996 | Bristol et al. |
| 5,566,065 | A | | 10/1996 | Hansen et al. |
| 5,570,282 | A | | 10/1996 | Hansen et al. |
| 5,587,896 | A | | 12/1996 | Hansen et al. |
| 5,644,948 | A | | 7/1997 | Karte et al. |
| 5,666,806 | A | | 9/1997 | Dietz |
| 5,704,011 | A | | 12/1997 | Hansen et al. |
| 6,189,564 | B1 | | 2/2001 | Hilton |

FOREIGN PATENT DOCUMENTS

| EP | 0 287 299 | 10/1988 |
| EP | 0 540 079 A1 | 5/1993 |
| EP | 0 571 080 | 11/1993 |
| EP | 0 572 245 | 12/1993 |
| EP | 0 793 155 | 9/1997 |
| FR | 2 609 519 | 7/1988 |
| FR | 2 609 519 | 7/1998 |
| WO | WO98/15741 | 4/1998 |

* cited by examiner

*Primary Examiner*—Leo Picard
*Assistant Examiner*—Sheela Rao
(74) *Attorney, Agent, or Firm*—Fish & Richardson P.C.

(57) ABSTRACT

A feed-forward flow controller is designed to calculate a target valve position from a target flow. Correction is made for liquid or gas pressure drop across the valve and for the valve flow modulating member geometry. This feed-forward action may also be used to linearize a feed-back flow control loop.

12 Claims, 6 Drawing Sheets

B: flow path fully open
C: flow path fully closed

INTELLIGENT VALVE FLOW LINEARIZATION

CROSS REFERENCE TO RELATED APPLICATION

This application is a divisional (and claims the benefit of priority under 35 U.S.C. § 120) of U.S. application Ser. No. 09/503.508, filed Feb. 14, 2000 now U.S. Pat. No. 7,096, 093. The disclosure of the prior application is considered part of (and is incorporated by reference in) the disclosure of this application.

TECHNICAL FIELD

This invention relates to controlling flow through a valve using a valve positioner.

BACKGROUND

A valve positioner system controls the position of a valve in response to a setpoint signal. For example, in a chemical mixing process, a valve positioner system may be used to regulate flow to control a concentration of a particular chemical in the mixing process. A chemical mixing process controller monitors the concentrations of all chemicals in the mix and provides setpoint signals to various valve positioners which control the flow of the chemicals.

A valve positioner system controls position of the valve by comparing a measured position with a setpoint or target position and changing an output used to control the position of the valve accordingly. The valve positioner system typically includes a current-to-pressure (i/p) transducer that receives a variable electrical input signal and provides a pneumatic output signal. The valve positioner employs the i/p transducer in a feedback loop that includes a pneumatic relay, a valve actuator, a valve having a valve stem attached to a valve flow modulating member, a positioner feedback linkage, a position sensor, and a microprocessor.

The microprocessor receives the setpoint signal and produces the input signal for the i/p transducer. The valve actuator responds to the pressure change produced by the pneumatic relay by driving the valve stem to control the degree to which the valve flow modulating member is open. The positioner feedback linkage transmits the position of the valve stem to the position sensor, which provides a signal indicative of the position to the microprocessor. The microprocessor then adjusts the signal supplied to the i/p transducer so as to move the valve flow modulating member to the position indicated by the setpoint, or to maintain the position of the valve flow modulating member at the setpoint.

SUMMARY

In one general aspect, a flow rate of a fluid through a valve flow modulating member controlled by a position of a valve stem is controlled by setting a target flow rate. A target valve stem position is determined based on the target flow rate. The valve stem position is adjusted until a position of the valve stem matches the target valve stem position.

Embodiments may include one or more of the following features. For example, determining the target valve stem position may include calculating a flow area of the valve flow modulating member and estimating a pressure coefficient. The flow area of the valve flow modulating member may be calculated using the measured flow rate and the estimated pressure coefficient.

The target valve stem position may be determined by determining a valve stem position corresponding to the calculated flow area. Determining the valve stem position may include using a predetermined relationship between the valve stem position and the flow area.

Additionally, calculating the flow area of the valve flow modulating member may include modelling flow rate through the valve flow modulating member relative to the flow area of the valve flow modulating member. In this way, a relationship between a pressure function, the flow area of the valve flow modulating member, and the flow rate through the valve flow modulating member may be determined. The pressure function is based on estimates of the fluid pressure upstream and downstream from the valve flow modulating member.

The fluid may be in a gaseous state. For such a fluid, the modelling may assume that an internal energy of the fluid is constant across the valve flow modulating member. Furthermore, the modelling may include estimating or determining from process data the pressure of the fluid upstream from the valve flow modulating member and the pressure of the fluid downstream from the valve flow modulating member. The pressure coefficient may be based on a ratio of the difference between the upstream pressure squared and the downstream pressure squared when the valve flow modulating member is fully open to that difference when it is fully closed.

The fluid also may be in a liquid state. In this case, the modelling may assume that a density of the fluid remains substantially constant as the fluid travels across the valve flow modulating member. The modelling may include estimating or determining from process data the pressure of fluid upstream from the valve flow modulating member and a pressure of the fluid downstream from the valve flow modulating member. The pressure coefficient may be based on a ratio of the difference in the upstream pressure and the downstream pressure when the valve flow modulating member is fully open to that difference when it is fully closed.

In another general aspect, a valve positioner system controls a flow rate of a fluid through a valve flow modulating member that is controlled by a position of a valve stem. To this end, the system includes a valve positioner coupled to the valve stem and a feed-forward flow controller.

The valve positioner compares a measured position of the valve stem with a target position and adjusts the valve stem to drive the measured position to the target position. The target position can be calculated to achieve a target flow through the valve. Also, an estimate of the actual flow can be back calculated from the measured valve position.

Embodiments may include one or more of the following features. For example, the feed-forward flow controller may be configured to determine a pressure coefficient that is based on one or more estimates of the pressure of the fluid relative to the valve flow modulating member.

The feed-forward flow controller may be configured to back calculate a flow area of the valve flow modulating member that corresponds to the measured valve stem position. The feed-forward flow controller may also be configured to back calculate a flow rate based on the back calculated flow area and the pressure coefficient.

The feed-forward flow controller may be configured to calculate a target flow area based on a target flow rate and the pressure coefficient.

The target valve stem position may be calculated based on the calculated feed-forward flow area. Calculating the target valve stem position may include using a predetermined relationship between valve stem position and a flow area of the valve flow modulating member which depends on the geometry of the valve flow modulating member.

Back calculating the flow area may include using a predetermined relationship between valve stem position and a flow area of the valve flow modulating member.

A purpose of the target flow determination is to linearize the process seen by a feed-back flow controller so that the feed-back flow controller tuning remains near optimal over the operating range of the process.

Other features and advantages will be apparent from the following description, including the drawings, and from the claims.

DRAWING DESCRIPTION

DETAILED DESCRIPTION

Figure 1:
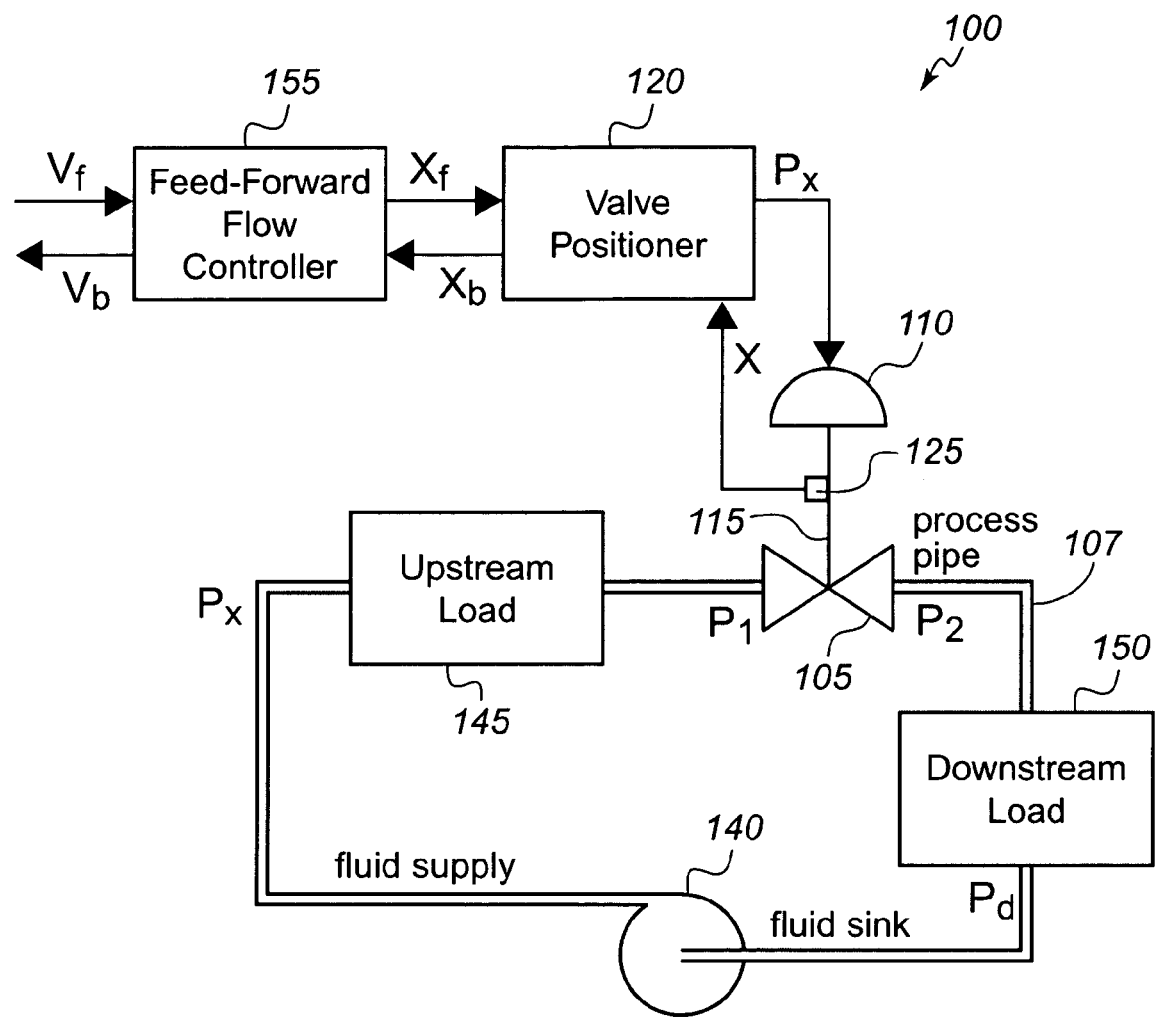
FIG. 1 is a block diagram of a valve positioner system that controls a position of a valve stem and a corresponding valve flow modulating member, and determines the position target from a flow target.
Figure 2:
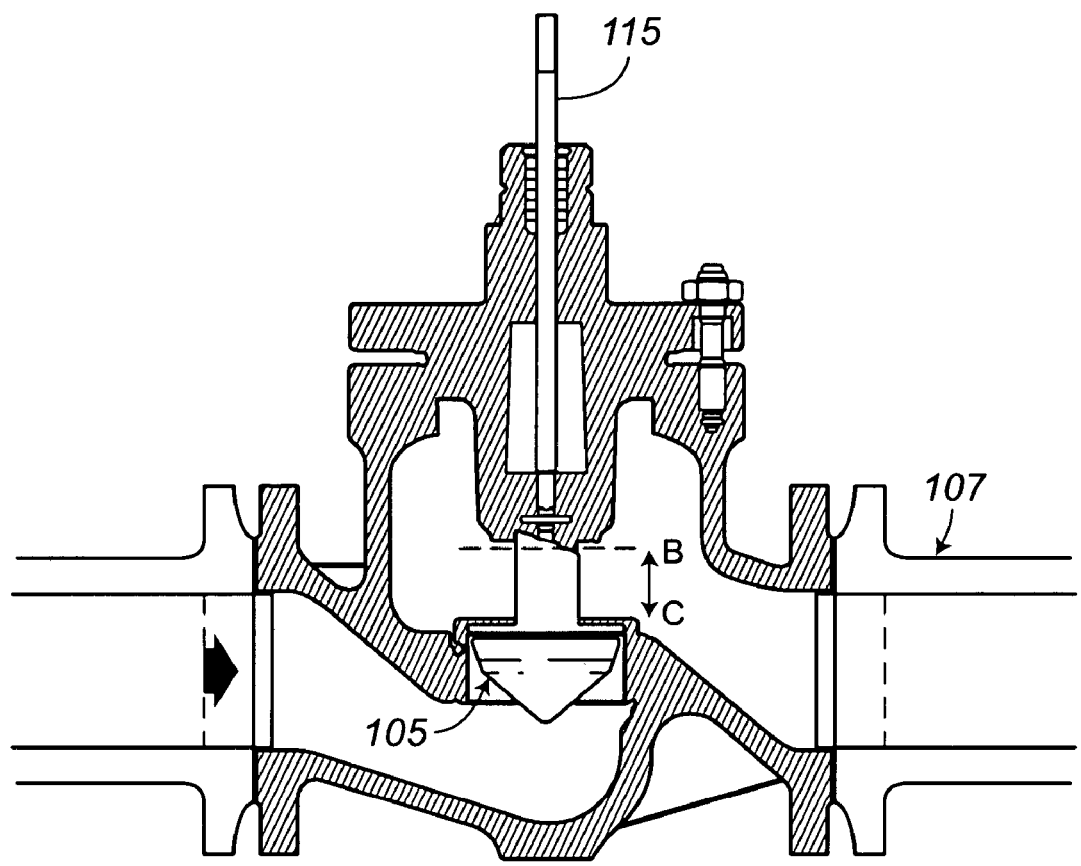
FIG. 2 is a drawing of a valve that includes a valve flow modulating member.

Referring to FIG. 1, a valve positioner system 100 includes a valve flow modulating member 105 that adjusts a flow rate F of a fluid through a fluid flow line defined by a process pipe or duct 107. A generalized example of the valve flow modulating member 105 and the process pipe 107 is shown in FIG. 2. For example, the valve flow modulating member 105 may be of the globe valve type or of the butterfly valve type. The valve flow modulating member 105 is designed to yield a predetermined relationship between valve position and the fluid flow rate F.

The valve flow modulating member 105 is positioned by a piston or diaphragm controlled by a pneumatic actuator or an electric actuator 110. Force or torque generated by the actuator 110 drives a valve stem 115 that is coupled to the valve flow modulating member 105. A position of the valve stem 115 is indicated by variable X. A change in the position X of the valve stem 115 causes a corresponding change in a valve flow modulating member area through which fluid flows. The valve flow modulating member 105 changes the flow rate F of the fluid by adjusting the valve flow modulating member area. Alternatively, the valve flow modulating member can be opened or closed by other means such as an electric motor or hydraulic actuator.

In FIG. 2, the valve stem 115 causes the valve flow modulating member 105 to move between a "closed" position C (in which the flow path is fully closed) and an "opened" position B (in which the flow path is fully opened).

When the valve flow modulating member 105 is in the opened position B, flow area A is at a maximum $A_{max}$.

A valve positioner 120 compares a valve stem position setpoint $x_f$ to the actual valve stem position X, measured by a position sensor 125, and adjusts a pressure $p_x$, in the pneumatic actuator 110 until the valve stem position X matches the setpoint $x_f$. Changes in the pressure $p_x$ produce corresponding changes in the position X of the valve stem 115. A feedback linkage is used to close the loop between the valve stem 115 and the valve positioner 120.

Fluid is supplied through the process pipe 107 using a pump or compressor 140. Fluid supplied from the pump or compressor 140 may have a load 145 upstream of the valve flow modulating member 105 and a load 150 downstream of the valve flow modulating member 105. Upstream of the valve flow modulating member 105, fluid pressure may be represented as $p_1$. Downstream of the valve flow modulating member 105, fluid pressure may be represented as $p_2$. The pressure differential across the valve flow modulating member 105 is therefore $p_1-p_2$ and the squared pressure differential is $p_1^2-p_2^2$. Pressure caused by the compressor or pump 140 to the upstream load 145 is $p_s$ and return pressure to the compressor or pump 140 after the downstream load 150 is $p_d$. For simplicity and ease of performing calculations, each variable—valve stem position X, fluid flow rate F, and flow area A—is normalized by its respective maximum value $X_{max}$, $F_{max}$, and $A_{max}$. Throughout this discussion, all variables are normalized, and are thus given in dimensionless units. Therefore, a normalized valve stem position, x equals $X/X_{max}$; a normalized flow rate v equals $F/F_{max}$; and a normalized area y equals $A/A_{max}$. Normalized variables range from 0 to 1. Moreover, the flow rate F may be a volumetric flow rate (that is, given in units of volume/time) or it may be a mass flow rate (that is, given in units of mass/time). Units for the flow rate are generally selected based on the state of the fluid. For example, for gases, a mass flow rate is used, whereas for liquids, either the mass flow rate or the volumetric flow rate may be used since density changes are assumed negligible.

An open-loop flow control correction makes the fluid flow rate approximately equal to its setpoint or target value. This feed-forward flow control correction may be implemented in a feed-forward flow controller 155, an analog output block, or the valve positioner 120. For the purposes of illustration, the feed-forward flow control correction is drawn as a separate component, that is, the feed-forward flow controller 155, in the valve positioner system 100.

The feed-forward flow controller 155 determines a normalized target valve stem position $x_f$ based on the target fluid flow rate $v_f$ and provides this target position $x_f$ to the valve positioner 120. The target fluid flow rate may result from an upstream controller or it may be manually modulated or fixed. The valve positioner 120 compares the valve stem target position $x_f$ to a normalized valve stem position $x_b$ generated from the position x measured by the position sensor 125, and adjusts the pressure $p_x$ in the pneumatic actuator 110 until the valve stem position x matches the target valve stem position $x_f$.

Figure 3:
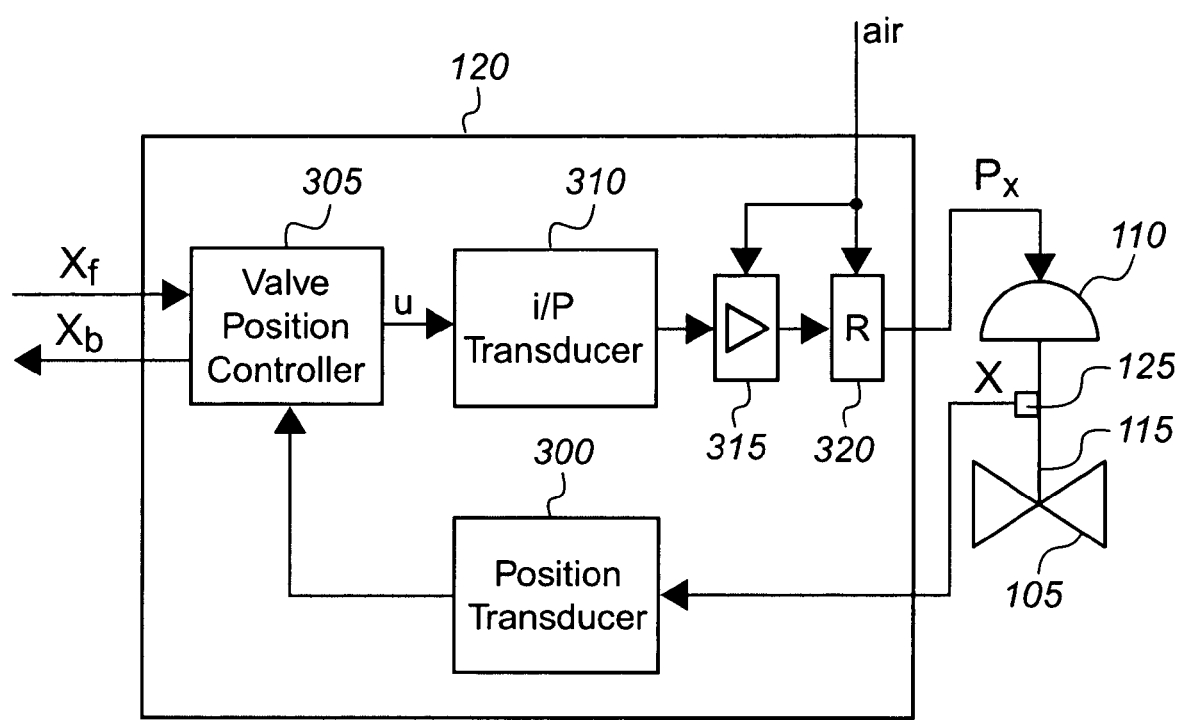
FIG. 3 is a block diagram of a valve positioner implemented in the valve positioner system of FIG. 1.

FIG. 3 provides a simplified block diagram of the valve positioner 120. A position transducer 300 receives feedback from the position sensor 125 coupled to the valve stem 115 and produces a signal indicative of the valve stem position. This feedback enables the valve positioner 120 and the feed-forward flow controller 155 to adjust the fluid flow rate.

The target valve stem position $x_f$ and the measured valve stem position x are supplied to a valve position controller 305 which may be implemented in a microprocessor. In many implementations, the target position signal takes the form of a digital signal that indicates a desired position for the valve stem. The target position signal-also may be an analog signal indicative of a desired valve stem position.

The valve position controller 305 uses proportional, integral, and derivative control (for example, PID control) to generate a control signal u that is dependent on the target valve stem position $x_f$ and the measured valve stem position x. A current-to-pressure (i/p) transducer 310 converts the valve position controller output signal u into a pneumatic signal. The i/p transducer 310 is used in conjunction with a pneumatic preamplifier 315 which may provide immunity to fluctuations in the supply air pressure. Output of the preamplifier 315 is fed to a pneumatic relay 320, which may increase the magnitude of the output pressure $p_x$ in addition to the flow rate of air supplied to the pneumatic actuator 110. Pneumatic actuator pressure is fed back to the relay 320. The i/p transducer 310, preamplifier 315, and relay 320 receive supply air that may be regulated at, for example, 20-90 psig. Pneumatic pressure $p_x$ from an output of the relay 320 is supplied to the pneumatic actuator 110. If a double-acting pneumatic actuator 110 is used, pressure is required on both sides of the pneumatic actuator for it to operate. Therefore, the pneumatic relay 320 has two outputs that feed the double-acting pneumatic actuator 110. For a single-acting pneumatic actuator 110, a spring supplies the required return force.

Figure 4:
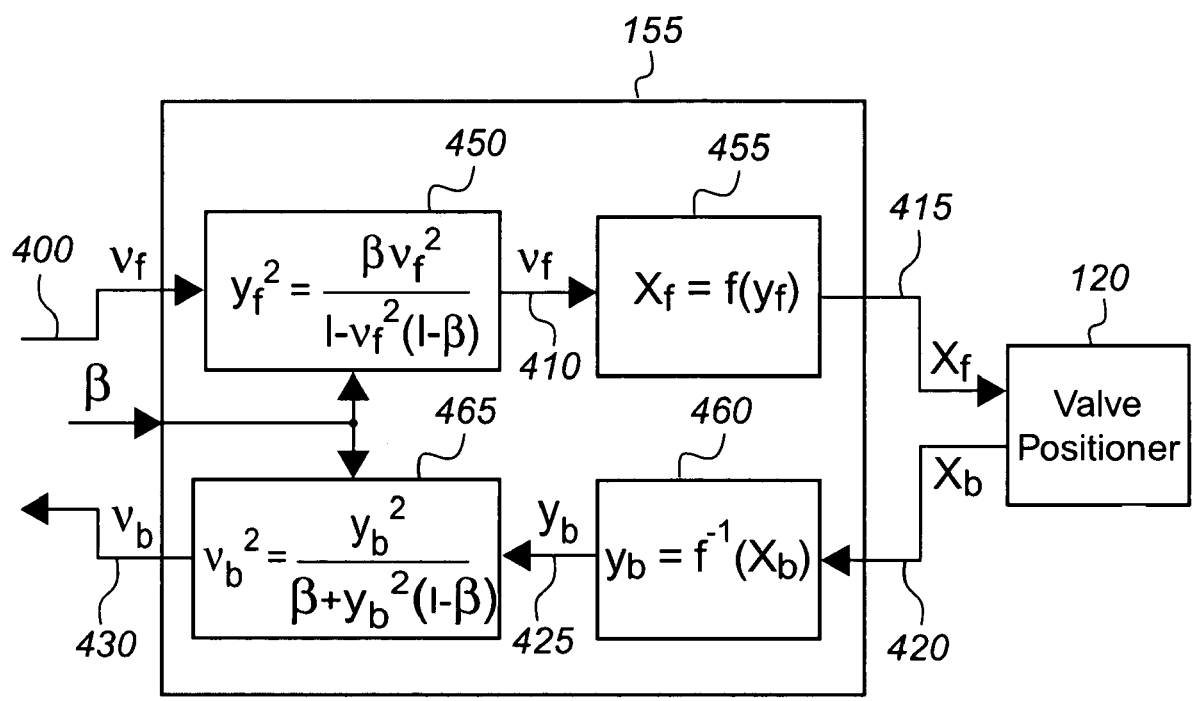
FIG. 4 is a flow chart of a procedure for calculating a target valve stem position and a fluid flow rate that corresponds to a measured valve stem position.

FIG. 4 provides a block diagram of the feed-forward flow controller 155. As noted above, the feed-forward flow controller 155 may be implemented within the valve positioner 120, and more specifically, within the valve position controller 305.

In general, the feed-forward flow controller 155 relates the target valve stem position $x_f$ to the target flow rate $v_f$ to provide a feed-forward open-loop correction to the valve stem position x. To do this, the feed-forward controller 155 calculates a target normalized valve flow area $y_f$ from the target flow rate $v_f$ and a user configured tuning parameter or pressure coefficient $\beta$. Then, using a predetermined relationship, $f$, the feed-forward controller 155 determines a target valve stem position $x_f$ that corresponds to the calculated target flow area $y_f$. The predetermined relationship $f$ is provided by the manufacturer of the valve assembly.

One example of the relationship $f$ written in its inverse form is:

$$y = f^{-1}(x) = \left(\frac{A_{max}}{A_{min}}\right)^{x-1}, \tag{1}$$

where $A_{max}$ and $A_{min}$ are, respectively, maximum and minimum flow areas. This relationship is used for equal percentage valves. When a linear valve is used, the relationship f may be expressed as a linear relationship. That is, $x=f(y)=y$.

The relationship between the flow rate $v_f$, the target flow area $y_f$, and the coefficient $\beta$ is determined by modelling fluid flow rate through the process pipe 107 and valve flow modulating member 105. For an ideal gas flowing through a pipe, the change in pressure (−dp) per unit length of pipe (dl), that is, −dp/dl, may be estimated by the equation:

$$-\frac{dp}{dl} = \frac{4f_p}{d} \cdot \frac{\rho \cdot V^2}{2g_c}, \tag{2}$$

where $f_p$ is a constant friction factor, d is the diameter of the pipe approximated to be circular in shape, p is an average density of the gas, V is the velocity of the gas, and $g_c$ is the gravitational constant. For a gas, the velocity V may be written in terms of the mass flow rate W using V=W/ρA. Therefore, Eqn. 2 becomes:

$$-\frac{dp}{dt} = \frac{4f_p}{d} \cdot \frac{W^2}{\rho \cdot A^2 \cdot 2g_c}. \tag{3}$$

For an ideal gas, p/ρ=RT, where p is the absolute pressure, ρ is the density of the gas, T is the absolute temperature, and R is the universal gas constant. Therefore, using this substitution, Eqn. 3 becomes:

$$-\frac{dp}{dl} = \frac{4f_p}{d} \cdot \frac{W^2 \cdot RT}{p \cdot A^2 \cdot 2g_c}, \tag{4}$$

Assuming enthalpy (and internal energy) remain constant along the length L of the pipe, the temperature T remains constant, and Eqn. 4 may be integrated:

$$-\int_{P_1}^{P_2} p\,dp = \frac{4f_p}{d} \frac{W^2 \cdot RT}{A^2 \cdot 2g_c} \int_0^L dl. \tag{5}$$

Integrating Eqn. 5 gives the relationship between the difference in pressure squared across the pipe relative to the mass flow rate W and orifice area A:

$$p_1^2 - p_2^2 = \frac{4f_p L}{d} \frac{RT}{g_c} \frac{W^2}{A^2}. \tag{6}$$

Solving for W/A, Eqn. 6 becomes:

$$\frac{W}{A} = \sqrt{\frac{d}{4f_p L}} \sqrt{\frac{g_c}{RT}} \sqrt{p_1^2 - p_2^2}. \tag{7}$$

A similar equation can be applied to flow through a sharp edged orifice using a fixed coefficient $C_D$=0.6:

$$\frac{W}{A} = 0.6 \sqrt{\frac{g_c}{RT}} \sqrt{p_1^2 - p_2^2}. \tag{8}$$

Figure 5:
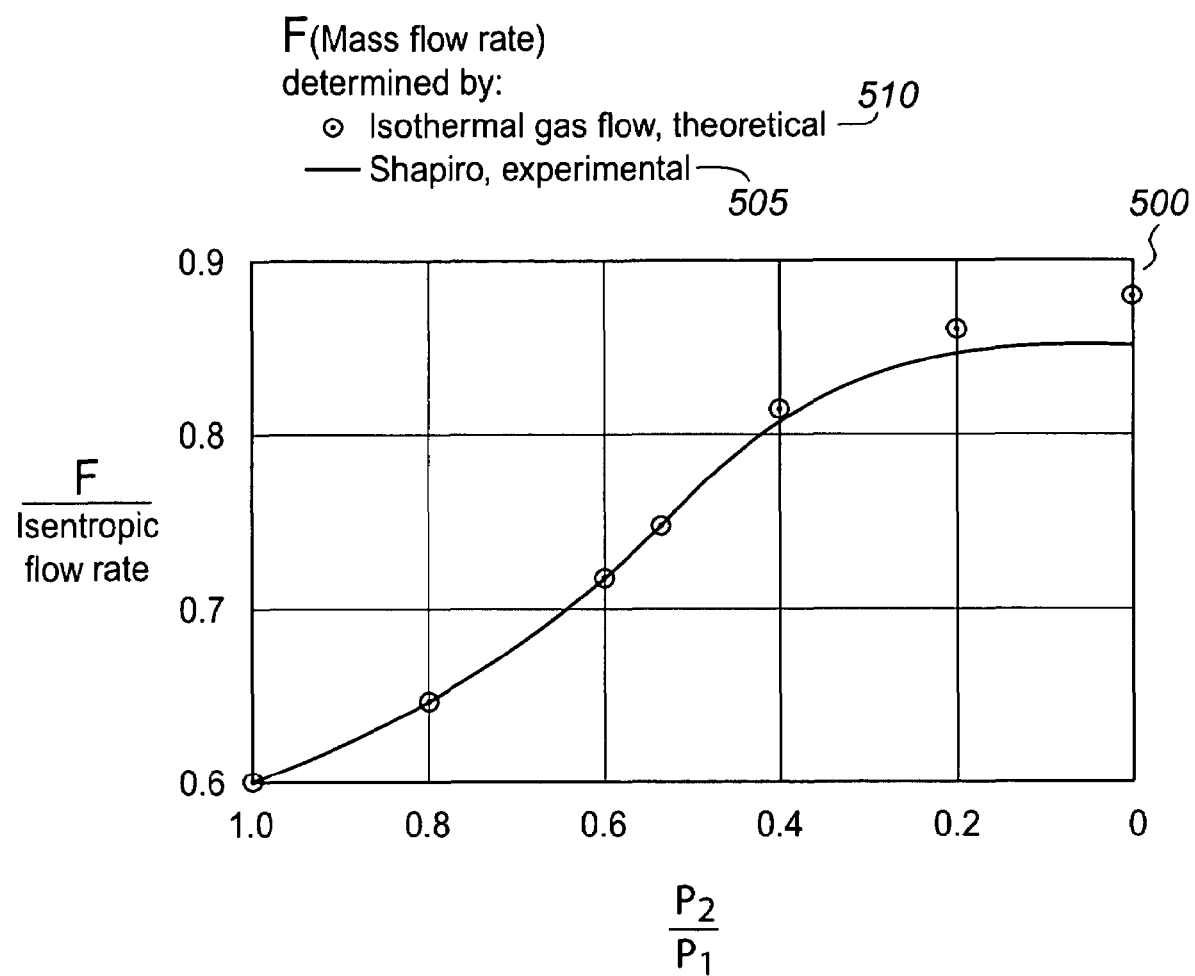
FIG. 5 is a graph comparing measured gas flow rate through an orifice with a gas flow rate that is calculated using isothermal approximations.

Referring also to graph 500 in FIG. 5, results from Eqn. 8 may be compared with experimental results 505 obtained by A. H. Shapiro in Chapter 4, pages 99-100 of "The Dynamics and Thermodynamics of Compressible Fluid Flow", which is incorporated herein by reference. Shapiro defines a discharge coefficient as the ratio of the actual flow rate F through an orifice to the flow rate calculated from isentropic laws for the initial $p_1$ and the final $p_2$ pressures of the orifice (labelled isentropic flow rate). The ratio is not constant because there is jet contraction in the fluid stream following the orifice that is affected by the downstream pressure propagating upstream in the low velocity eddies. Typically, design procedures are based on the use of the isentropic flow formulas modified by empirically determined variable coefficients such as the coefficient of discharge.

The ratio between the flow rate in Eqn. 8 which is determined using constant-temperature (that is, isothermal) flow formulas, and the isentropic flow rate is shown as open-circled results 510 in graph 500. Results 510 are in good agreement with experimental values 505.

Therefore, Eqn. 8 is used to determine, for an ideal gas, the relationship between the target flow rate $v_f$ and the target area $y_f$ that will be used in the feed-forward flow controller 155. Rewriting A in terms of the maximum area $A_{max}$ and the area y, solving for $p_1^2-p_2^2$, and setting a parameter $K_v$ equal to $g_c C_D^2 A_{max}^2/RT$ gives:

$$\delta(p_v^2) = p_1^2 - p_2^2 = \frac{1}{K_v} \frac{W^2}{y^2}. \qquad (9)$$

The derivation of the relationship used by the feed-forward flow controller between the fluid flow rate through an orifice and the orifice area will be developed first with respect to liquids and then with respect to gases. For liquids, the commonly-used relationship between the pressure differential across an orifice, the liquid flow rate, and orifice area is found by assuming that the density of the liquid remains constant across the orifice. This relationship is written:

$$\delta p_v = p_1 - p_2 = \frac{1}{K_v} \frac{F^2}{y^2}. \qquad (10)$$

A pressure differential (also called a pressure functional) from the pump or compressor 140 to and from the valve flow modulating member 105 in the fluid line may be written as $\delta p_L$. Upstream from the orifice, the pressure functional is $p_s-p_1$ and downstream from the orifice, the pressure functional is $p_2-p_d$. The sum of these pressure functionals depends on the loads 145 and 150 in the fluid line and is given by the expression:

$$\delta p_L = \frac{F^2}{K_L}, \qquad (11)$$

where $K_L$ is a constant that depends on the load values 145 and 150. Note that the normalized area y does not enter into Eqn. 11 because the pressure functionals are measured outside the valve flow modulating member.

A total pressure functional, $\delta p$, between the supply and drain is $p_s-p_d$ and is found by adding Eqns. 10 and 11:

$$\delta p = \delta p_v + \delta p_L = F^2\left(\frac{1}{K_v y^2} + \frac{1}{K_L}\right), \qquad (12)$$

or $$\delta p = F_{max}^2\left(\frac{1}{K_v} + \frac{1}{K_L}\right). \qquad (13)$$

The fluid flow rate v is:

$$v^2 = \frac{F^2}{F_{max}^2} = \frac{\frac{1}{K_v} + \frac{1}{K_L}}{\frac{1}{K_v y^2} + \frac{1}{K_L}}, \qquad (14)$$

where $F_{max}$ is the maximum flow rate corresponding to a maximum area $y_{max}=1$. Because the pressure coefficient $\beta$ need not be an exactly calculated quantity to obtain a substantial improvement in the behavior of the flow loop, it may be estimated using maximum flow conditions, namely v=y=1. If the coefficient $\beta$ is defined as:

$$\beta = \frac{\delta p_V (v = y = 1)}{\delta p} = \frac{\frac{1}{K_V}}{\frac{1}{K_V} + \frac{1}{K_L}}, \qquad (15)$$

then Eqn. 14 becomes:

$$\frac{1}{v^2} = (1-\beta) + \frac{\beta}{y^2}. \qquad (16)$$

For gases, the flow derivation follows much the same form as it does for liquids. First, a squared absolute pressure differential (or absolute pressure functional) across the fluid line, equals $p_s^2-p_1^2$ for the upstream fluid line and $p_2^2-p_d^2$ for the downstream fluid line, and their sum is generally written as:

$$\delta(p_L^2) = \frac{W^2}{K_L}. \qquad (17)$$

The squared absolute pressure functional between the supply and drain is $\delta(p^2)$, the sum of $\delta(p_L^2)$ from Eqn. 17 and $\delta(p_v^2)$ from Eqn. 9:

$$\delta(p^2) = W^2\left(\frac{1}{K_v y^2} + \frac{1}{K_L}\right). \qquad (18)$$

Writing the normalized flow rate v as:

$$v^2 = \frac{W^2}{W_{max}^2} = \frac{\frac{1}{K_V} + \frac{1}{K_L}}{\frac{1}{K_V y^2} + \frac{1}{K_L}}, \quad (19)$$

and defining the coefficient β to be:

$$\beta = \frac{\delta(p_v^2(v=y=1))}{\delta(p^2)} = \frac{\frac{1}{K_V}}{\frac{1}{K_V} + \frac{1}{K_L}}, \quad (20)$$

gives the relationship between the fluid flow rate v and the area y:

$$\frac{1}{v^2} = (1-\beta) + \frac{\beta}{y^2}. \quad (21)$$

Therefore, using the isothermal flow equations, gases may easily be treated like liquids using Eqns. 16 and 21.

Referring again to FIG. 4, the feed-forward flow controller 155 receives a target normalized flow rate $v_f$ 400 in addition to the predetermined pressure coefficient β 405 to calculate (step 450) a target normalized flow area $y_f$ 410. Then, using the predetermined function f, the target normalized valve stem position $x_f$ 415 is calculated (step 455). This target valve stem position $x_f$ 415 is fed into the valve positioner 120 which then adjusts the pressure $p_x$ in the pneumatic actuator 110 to change the valve stem position and cause a change in the flow area and therefore a change in the fluid flow rate. Feedback from the position sensor 125 is provided to the valve positioner which then sends a measured normalized valve stem position $x_b$ 420 to the feed-forward flow controller 155.

The feed-forward flow controller 155 then performs a back calculation to provide a flow feedback signal to an upstream controller. First, the feed-forward flow controller 155 uses a function $f^{-1}$ that is the inverse of the manufacturer supplied function f to calculate (step 460) a normalized flow area $y_b$ 425 that corresponds to the measured valve stem position $x_b$ 420. Using the corresponding flow area $y_b$ 425, the feed-forward flow controller 155 performs an inverse calculation (step 465) of the calculation 450 to determine a normalized flow rate $v_b$ 430 that corresponds to the measured valve stem position $x_b$ 420. The normalized flow rate $v_b$ 430 may be fed back to an upstream controller which then adjusts its output, $v_f$ typically using PID feedback control. The flow feedback signal is used to help initialize the upstream controller and to avoid integrator windup.

Figure 6:
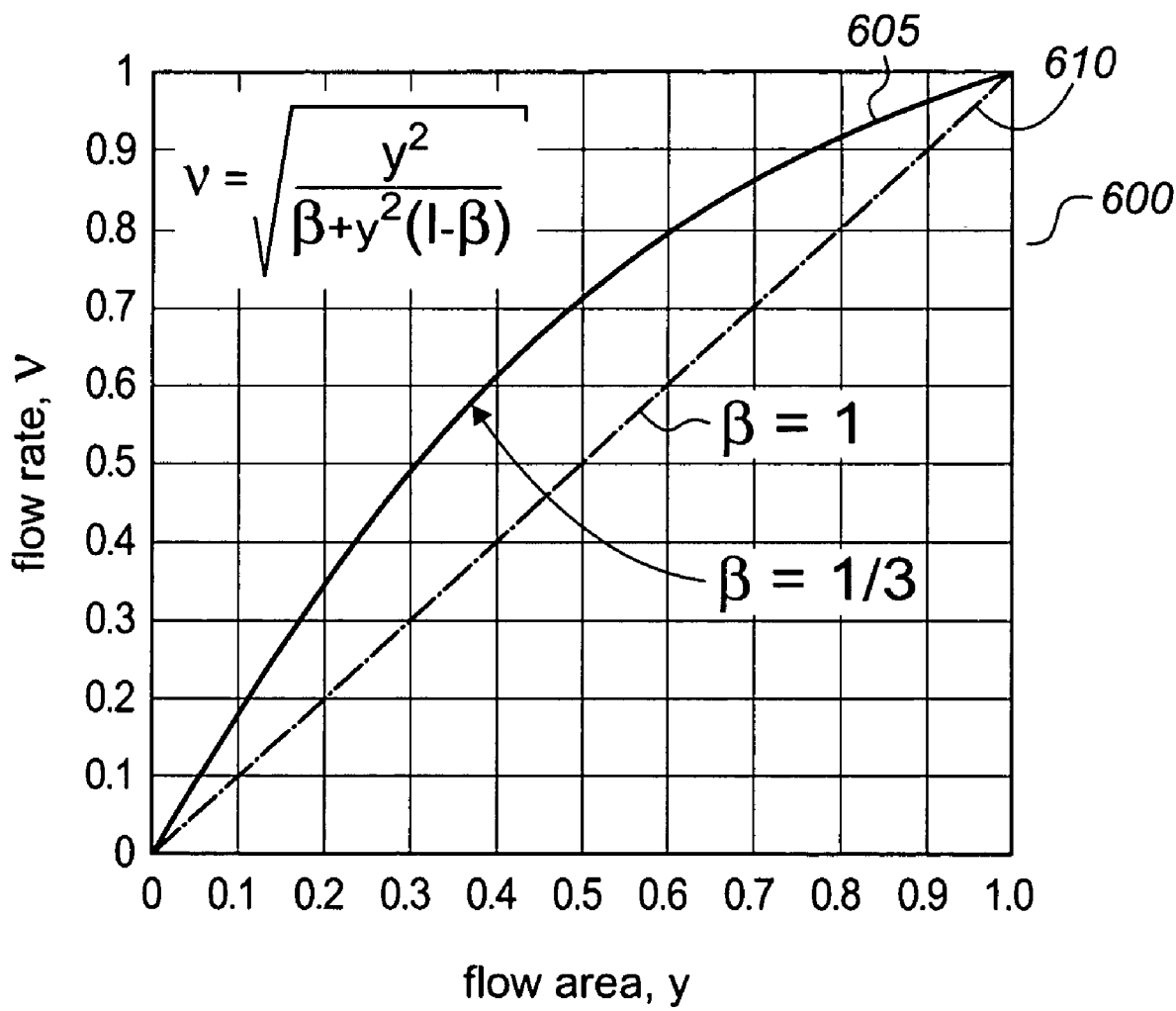
FIG. 6 is a graph showing a relationship between fluid flow rate and flow area for a pressure coefficient $\beta$ with a value of ⅓ and 1.

A graph 600 of the flow rate v versus the flow area y is shown in FIG. 6. Values of the flow area y ranged from 0 to 1. The coefficient β was set to ⅓ in this example, to provide maximum power to a load when the valve flow modulating member is fully open. The relationship between the valve stem position x and the flow area y is assumed linear for the purposes of illustration. The nonlinear flow rate v vs. area y is graphed in the solid line 605, for β=⅓. The dashed line 610 represents a linear relationship which is achieved when β=1 (that is, all of the pressure drop is across the valve).

Other embodiments are within the scope of the following claims.

What is claimed is:

1. A valve positioner system that controls a flow rate of a fluid through a valve flow modulating member that is controlled by a position of a valve stem, the system comprising:
   a valve positioner coupled to the valve stem and configured to measure a position of the valve stem;
   a feed-forward flow controller configured to:
   receive the measured valve stem position from the valve positioner,
   receive a target flow rate, and
   calculate a target valve stem position based on the target flow rate;
   wherein the valve positioner adjusts the valve stem position until a position of the valve stem matches the target valve stem position.

2. The system of claim 1, wherein the feed-forward flow controller is configured to determine a pressure coefficient that is based on one or more estimates of the pressure of the fluid relative to the valve flow modulating member.

3. The system of claim 2, wherein the feed-forward flow controller is configured to:
   calculate a flow area of the valve flow modulating member that corresponds to the measured valve stem position; and
   calculate a flow rate based on the calculated flow area and the pressure coefficient.

4. The system of claim 3, wherein the target valve stem position is calculated based on the calculated flow area.

5. The system of claim 4, wherein calculating the target valve stem position comprises using a predetermined relationship between valve stem position and a flow area of the valve flow modulating member.

6. The system of claim 3, wherein calculating the flow area comprises using a predetermined relationship between valve stem position and a flow area of the valve flow modulating member.

7. The system of claim 3, wherein calculating the flow area of the valve flow modulating member comprises modelling flow rate through the valve flow modulating member to determine a relationship between a function of fluid pressure upstream and downstream from the valve flow modulating member, the flow area of the valve flow modulating member, and the target flow rate through the valve flow modulating member.

8. The system of claim 7, wherein the fluid is in a gaseous state.

9. The system of claim 8, wherein the modelling assumes that an internal energy of the fluid is constant across the valve flow modulating member.

10. The system of claim 7, wherein the fluid is in a liquid state.

11. The system of claim 10, wherein the modelling assumes that a density of the fluid remains substantially constant across the valve flow modulating member.

12. A valve positioner system that controls a flow rate of a fluid through a valve flow modulating member that is controlled by a position of a valve stem, the system comprising:
   a valve positioner coupled to the valve stem and configured to measure a position of the valve stem; and
   a feed-forward flow controller configured to:
   receive the measured valve stem position from the valve positioner, receive a target flow rate,
receive a pressure coefficient,
calculate a first flow area based on the target flow rate and the pressure coefficient;
calculate a second flow area that corresponds to the measured valve stem position,
calculate a flow rate based on the calculated second flow area and the pressure coefficient,
calculate a target valve stem position based on the calculated first flow area;

wherein the valve positioner adjusts the valve stem position until a position of the valve stem matches the target valve stem position.

* * * * *